E. R. DRAVER.
TIRE COVER.
APPLICATION FILED JAN. 29, 1917.
1,286,253.
Patented Dec. 3, 1918.
3 SHEETS—SHEET 2.
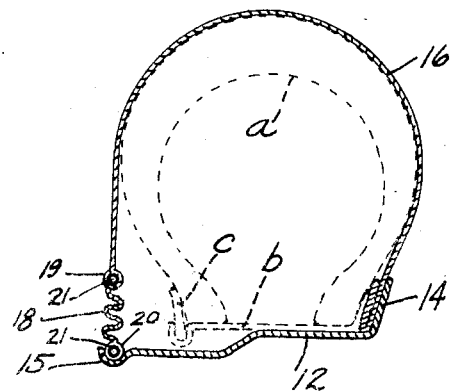
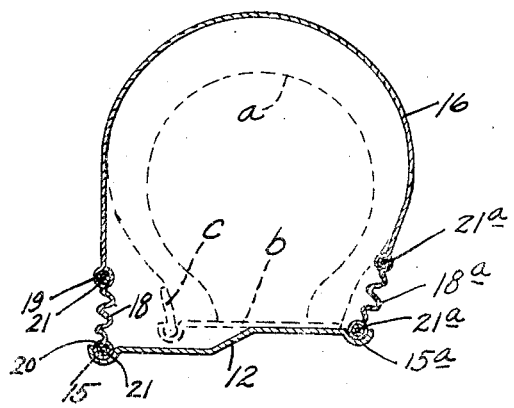
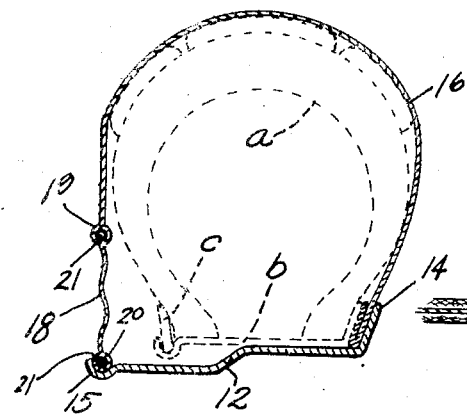
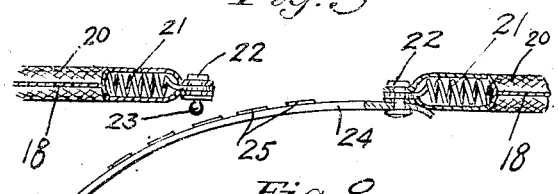
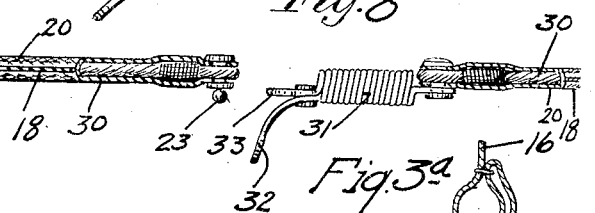
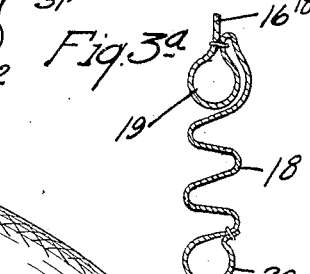
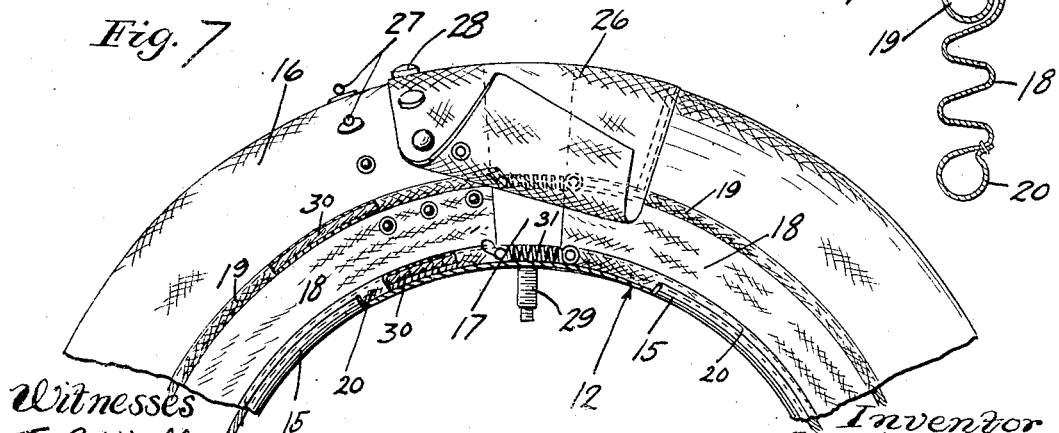
Witnesses
E. C. Wills
H. L. Opsahl
Inventor
E. R. DRAVER
By his Attorneys

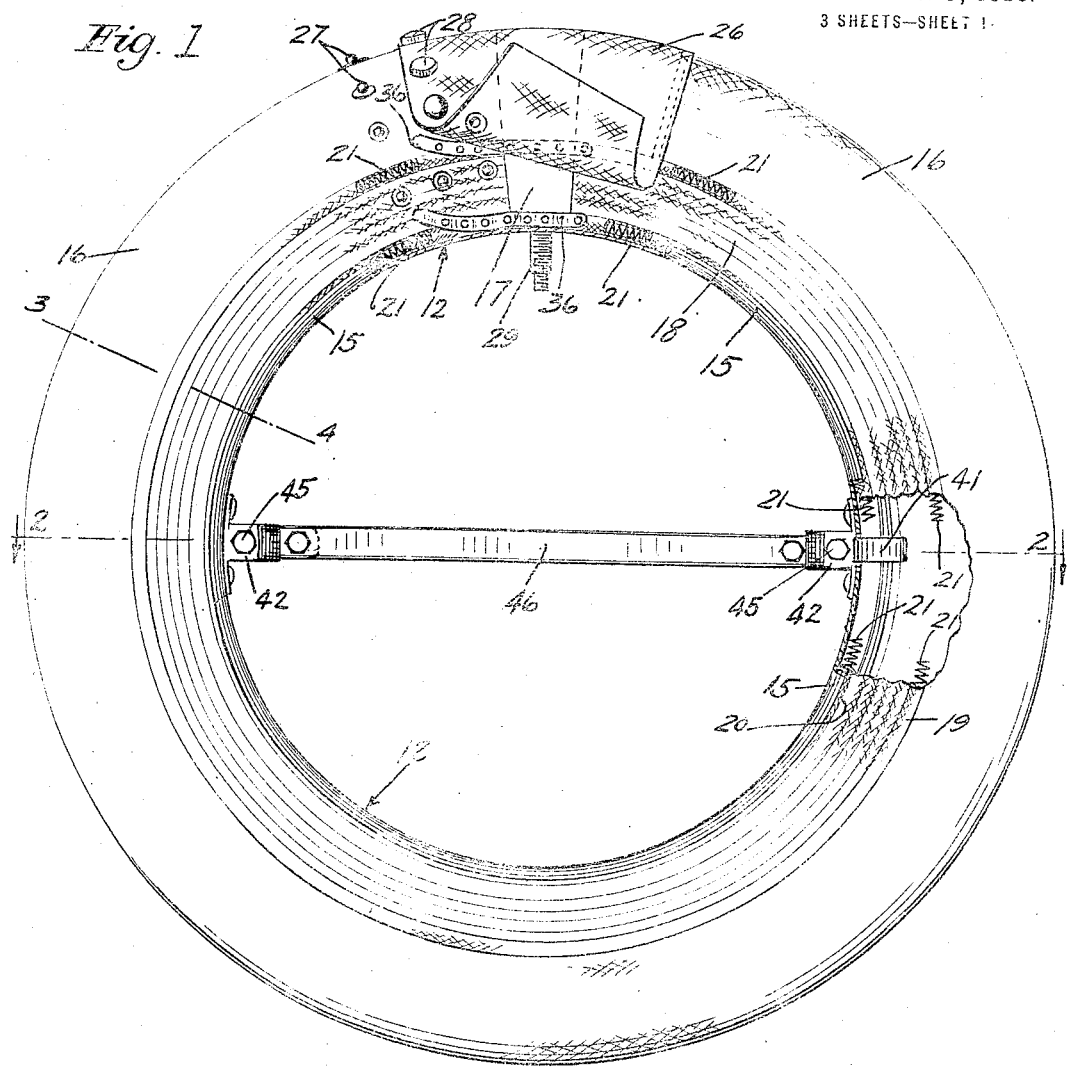
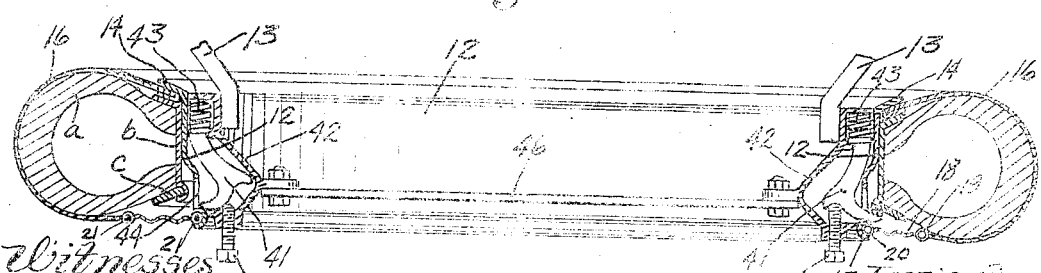

E. R. DRAVER.
TIRE COVER.
APPLICATION FILED JAN. 29, 1917.

1,286,253.

Patented Dec. 3, 1918.
3 SHEETS—SHEET 3.

Witnesses
E. G. Wells
H. L. Opsahl

Inventor
E. R. Draver
By his Attorneys
William Richards

UNITED STATES PATENT OFFICE.

EMIL R. DRAVER, OF RICHMOND, INDIANA.

TIRE-COVER.

1,286,253.     Specification of Letters Patent.     Patented Dec. 3, 1918.

Application filed January 29, 1917. Serial No. 145,046.

*To all whom it may concern:*

Be it known that I, EMIL R. DRAVER, a citizen of the United States, residing at Richmond, in the county of Wayne and State of Indiana, have invented certain new and useful Improvements in Tire-Covers; and I do hereby declare the following to be a full, clear, and exact description of the invention, such as will enable others skilled in the art to which it appertains to make and use the same.

My present invention has for its object to provide an improved tire cover, and in some respects, is in the nature of a modification of, or improvement on the cover disclosed and claimed in my prior Patent No. 1,211,377, of date, January 2nd, 1917. Generally stated, the invention consists of the novel devices and combinations of devices hereinafter described and defined in the claims.

As a feature of this invention, the flexible cover, at one side (or at both sides, when desired), is provided with a collapsible annular diaphragm and with tension bands at the inner and outer edges of said diaphragm. These tension bands, in some instances, are elastic throughout their entire bodies, and, in other instances, they are made elastic by interposing a spring at some particular point or points, and both are provided at their ends with separable coupling devices, by means of which they may be coupled to form endless tension bands.

This improved tire cover will incase and hold itself tightly drawn and substantially smooth, either on smooth faced or rough tread tires, which tires, as is well known, vary considerably in diameter; and the flexible diaphragm adapting the cover to make a close joint with a tire carrying hoop, for example, but also with various different forms of tire or wheel carriers, regardless of the expansion or contraction of the exterior of the tire cover.

In the accompanying drawings which illustrate the several forms of the improved carrier and cover, like characters indicate like parts throughout the several views.

Referring to the drawings;

Figure 1 is a rear elevation with some parts broken away, showing the tire carrier and cover and a demountable rim and tire held and covered thereby;

Fig. 2 is a horizontal section on the line 2—2 of Fig. 1;

Fig. 3 is a section taken on line 3—4 of Fig. 1, showing the diaphragm partly contracted and showing the cover applied to a smooth tread tire;

Figure 9:
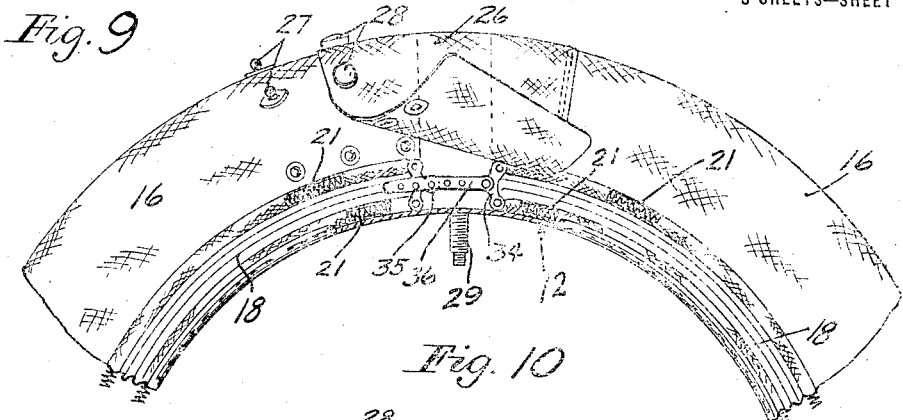
Figure 10:
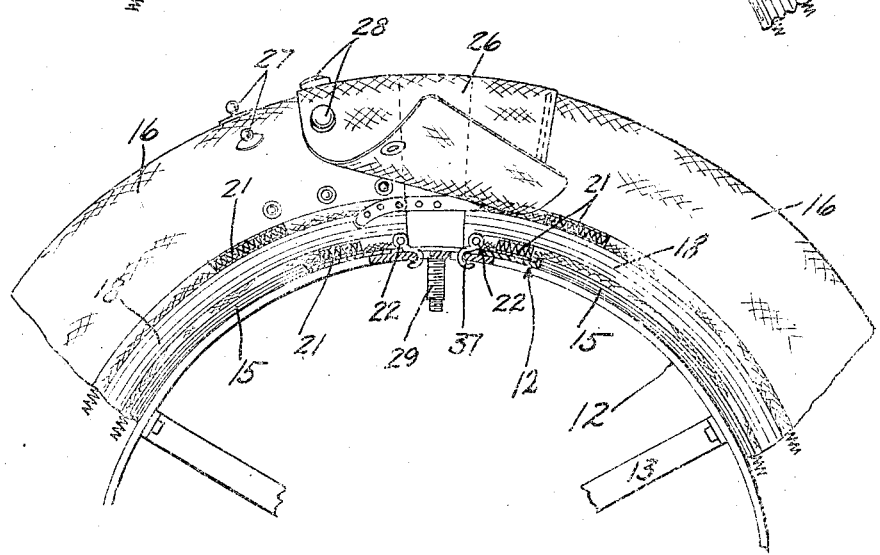
Figure 11:
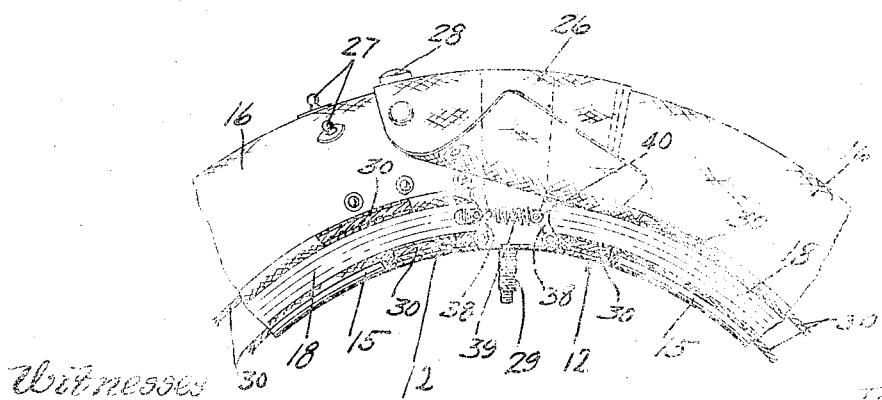

Fig. 3ᵃ is an enlarged radial section of the flexible diaphragm;

Fig. 4 is a similar sectional view showing the diaphragm expanded and showing the cover applied to a rough tread tire;

Fig. 5 is a fragmentary detail in plan and with some parts broken away, showing the preferred form of fastener for the ends of the casing and ends of the tension bands;

Fig. 6 is a section corresponding to Fig. 3, but illustrating a modification;

Fig. 7 is a fragmentary view corresponding to Fig. 1, but illustrating a modified form of fastener for the ends of the cover and tension bands;

Fig. 8 is a plan view with some parts broken away and some parts sections, illustrating, on a larger scale, the separable fastener employed in the construction illustrated in Fig. 7; and Figs. 9, 10 and 11 are views corresponding to Fig. 7, but illustrating slightly modified forms of certain of the devices.

Describing first the construction illustrated in Figs. 1 to 5, inclusive, the character *a* indicates the casing of an ordinary pneumatic tire, and the character *b* indicates a demountable rim, which may be of a well known type which is equipped with a split ring *c*, but which demountable rim may, so far as this invention is concerned, be of any suitable character.

The tire carrying hoop, which is preferably a compressed or rolled metal structure, is indicated, as an entirety, by the numeral 12, and it will be noted that the inner portion thereof, is, as illustrated, of somewhat greater diameter than the outer portion thereof, this, however, being only a preferred construction. This carrying hoop will be rigidly connected to a suitable part of the automobile body or frame by any suitable means, such as by means of brackets 13 shown in Fig. 2. At its inner edge, the carrying hoop 12 has a projecting clamping flange 14, and at its outer edge, it is formed with a depressed channel or groove 15, for a purpose which will presently appear.

A flexible tire cover which is of a flexible material, such, for example, as oil cloth, is of such construction that when expanded, it will have an annular form and will be channel-shaped in cross section, but not definitely confined to any exact shape; but, on the contrary, best adapted to conform to the shape of the inclosed tire casing, regardless of whether the same has a smooth or knobbed surface. The inner edge of this cover 16 is preferably folded upon itself and thus reinforced, and this reinforced edge is adapted to be clamped between the flange 14 and the adjacent flange of the demountable rim $b$, as best shown in Figs. 3 and 4. At one place, this annular cover is transversely split to form a gap 17 (see Fig. 1). The outer edge of the flexible cover 16 is terminated radially outward of the inner portion of the tire casing, and attached thereto is a collapsible annular diaphragm or web 18 which may be of the same material as the cover itself, or of different material. As shown, the said collapsible annular diaphragm is made integral with the tire cover, and on the line where it may be assumed to be joined, it is formed with a hem 19, and at its extreme inner edge, the said diaphragm is formed with another hem 20. The diaphragm is also split or formed with a gap that constitutes a continuation of the gap 17, so that the entire cover, including the diaphragm, may be removed from the tire by separating its ends, and applied to the tire by bringing its ends together. It is essential, of course, that the cover be split to such an extent, transversely, as to permit the ready application of the cover to the tire, and its removal therefrom. In the hems 19 and 20, are placed tension bands which are, preferably also, split at the gap 17 and provided thereat with separable fasteners, the preferred construction of which is illustrated in Fig. 5. In this preferred construction, the tension bands are in the form of small and long coiled springs 21, the ends of which are securely fastened to the ends of the respective hems, by means of rivets 22, or the like. One of the said rivets 22 is formed with a projecting head 23 and the other rivet is fastened to one end of a coupling strap 24, as best shown in Fig. 5. This coupling strap 24 is formed with longitudinally spaced eyelets 25, in any of which the studded head 23 is adapted to be engaged. The said studded head and eyelets frictionally engage after the manner of an ordinary glove fastener.

The innermost tension band 21 is of such length that it is adapted to tightly clamp the hem 20 directly in the outer edge channel 15 of the carrying hoop, as shown in Figs. 3 and 4. When the cover is applied to a smooth faced tire, for example, as shown in Fig. 3, the outer tension band will draw the outer edge of the cover proper and contract the same, thereby collapsing the diaphragm, as shown in Fig. 3; but when the said cover is applied to a tire having knobs and which is of greater external diameter than the smooth faced tire, the said diaphragm will be collapsed or buckled but very slightly, as illustrated in Fig. 4. In both instances, and regardless of a very considerable variation in the tire, the cover will be held taut against the same, and the buckling or collapsing action will take place, in the diaphragm, rather than in the cover, although the inner edge of the outer portion of the cover will, in some instances be slightly contracted circumferentially.

To cover the gap 17, the tire cover 16, at one end, is provided with a lap flap 26 that is adapted to be attached to the other end of the cover by separable fasteners 27 and 28, preferably of the glove fastener type. The inner part of the tire will, of course, have the customary charging nipple 29, and both the demountable rim and the carrying hoop will have perforations for clearing and passing the same.

The construction illustrated in Fig. 6 is like that illustrated in Figs. 1 to 5, inclusive, with the following exceptions: The carrying hoop 12, instead of having the inner edge flange 14, is provided with an inner edge channel 15$^a$, and the cover, at its inner edge, as well as at its outer edge, is provided with a flexible annular diaphragm 18$^a$ and corresponding tension bands 21$^a$, operating in a manner corresponding to the parts designated by the same numerals with the exponent letters omitted. Otherwise stated, the cover shown in Fig. 6 will, by the outer tension bands 21 and 21$^a$, be yieldingly drawn taut and smooth from both sides, rather than from one side, as illustrated in Figs. 1 to 5, inclusive. The tension bands 21$^a$, like the tension bands 21, will preferably be split and provided with separable fasteners at their ends.

The construction illustrated in Figs. 7 and 8, is like that illustrated in Figs. 1 to 5, inclusive, except in the separable fasteners in the ends of the tension bands, and except that the tension bands, themselves, are of modified form. In this arrangement, the tension bands are in the form of small cables 30 which will be placed in the hems 19 and 20 and secured at their ends to the ends of the cover with the rivets 22, as in the previously described construction. Here the elasticity is given to the tension bands by short coiled coupling springs 31 secured to the rivet 22 at one end of each cable 30, and provided at their free ends with pull straps 32 and eyes 33, which latter are engageable with the stud heads 23.

The construction illustrated in Fig. 9 is like that illustrated in Figs. 1 to 5, inclusive, except that the corresponding ends of the spring tension bands 21 are connected by short equalizing links 34, one of which is provided with a headed stud 35, and the other of which is provided with a coupling strap 36 formed with eyelets that are engaged with the said headed stud 35.

The construction illustrated in Fig. 10 is like that illustrated in Figs. 1 to 5, inclusive, except that the studs 22, at the ends of the inner clamping band 21, are provided with anchoring hooks 37 that are engageable with perforations in the carrying hoop 12.

The construction illustrated in Fig. 11 is like that illustrated in Fig. 7, except that the corresponding ends of the cable bands 30 are connected with short equalizing links 38, and a coupling spring 39 is permanently connected to the intermediate portion of one of said links and detachably connected to the intermediate portion of the other link by suitable means, such as a stud and eye connection 40.

A fastening device, such as illustrated in Figs. 1 and 2 of the drawing, is provided, and this device comprises at least one, but as shown and preferred, two lock dogs 41. These lock dogs, because of their peculiar form, may be designated as "boot-shaped." They are flat structures and are loosely seated in narrow pockets 42 secured to the interior of the carrying hoop 12, preferably at diametrically opposite points. Small coiled springs 43 seated in the pockets 42, act against the leg ends of the dogs and normally hold the same retracted, as indicated at the left in Fig. 2, and with the heels of the boot structure against the backs of the pockets. The carrying hoop has passages 44 through which the toe ends of the dogs are adapted to be forced into engagement with the outer edge of the demountable rim, as shown at the right in Fig. 2, under the action of set screws 45 that have screw-threaded engagement with the outer ends of the pockets 42 and engage against the sole portions of the said "boot-shaped" dogs. When the set screws 45 are tightened, they have a camming action on the dogs and will force the same into operative position shown at the right in Fig. 2, until they have been tightened against the heel portions of the said dogs, as shown at the right in Fig. 2. These dogs, when thrown under the action of the springs 43 will be automatically released by a movement that is radially inward and laterally outward in respect to the rim, and they will be forced into operative positions by reverse movement. Moreover, the said dogs, after they have engaged with the outer edge of the demountable rim, can be forced bodily inward by tightening of the set screws 45, so as to thereby force the demountable rim laterally and clamping the inner edge of the cover between the inner flange of said rim and the outstanding clamping flange 14 of the carrying hoop.

The bar 46 (see Figs. 1 and 2), is preferably extended diametrically across the interior of the carrying hoop, and this bar, as shown, is bolted to lugs on the inwardly bulged portions of the pocket 42. Either the tail light, or a bar plate, or both, may be conveniently attached to this bar, and furthermore, the said bar reinforces and stiffens the carrying hoop.

What I claim is:

1. A flexible tire cover having concentric inner and outer tension bands, the portion between said bands affording an annular collapsible diaphragm.

2. A flexible tire cover having a collapsible annular diaphragm at an edge thereof, the said cover being transversely split to adapt it for application over a tire, and concentric tension bands applied to the inner and outer edge portions of said diaphragm.

3. A flexible tire cover having a collapsible annular diaphragm at an edge thereof, the said cover being transversely split to adapt it for application over a tire, and concentric elastic tension bands applied to the inner and outer edge portions of said diaphragm.

4. A flexible tire cover having a collapsible annular diaphragm at an edge thereof, the said cover being transversely split to adapt it for application over a tire, and concentric tension bands applied to the inner and outer edge portions of said diaphragm the said tension bands having separable couplings at the transverse split of said cover.

5. A flexible tire cover having a collapsible annular diaphragm at an edge thereof, the said cover being transversely split to adapt it for application over a tire, concentric tension bands applied to the inner and outer edge portions of said diaphragm, and the said tension bands having their ends anchored to the split ends of said cover and provided with separable couplings.

6. A flexible tire cover having a collapsible annular diaphragm at an edge thereof, the said cover being transversely split to adapt it for application over a tire, concentric tension bands applied to the inner and outer edge portions of said diaphragm, and the said tension bands having their ends anchored to the split ends of said cover and provided with separable couplings, the said couplings including two elements, one in the form of a headed stud and the other in the form of a strap having eyelets for engaging said stud.

7. An annular substantially channel-shaped flexible tire cover provided at both inner edges with collapsible annular diaphragms, and concentric elastic tension bands applied at the inner and outer portions of said collapsible diaphragms, the said inner clamping bands being adapted to form a tight joint between the cover and coöperating elements of a tire carrier.

In testimony whereof I affix my signature in presence of two witnesses.

EMIL R. DRAVER.

Witnesses:
 CLARA DEMAREST,
 BERNICE G. WHEELER.